(12) United States Patent
Noppens

(10) Patent No.: US 8,484,554 B2
(45) Date of Patent: Jul. 9, 2013

(54) PRODUCING A CHART

(75) Inventor: Kai Noppens, Tamm (DE)

(73) Assignee: SAP AG, Walldorf (DE)

( * ) Notice: Subject to any disclaimer, the term of this patent is extended or adjusted under 35 U.S.C. 154(b) by 1007 days.

(21) Appl. No.: 11/514,008

(22) Filed: Aug. 31, 2006

(65) Prior Publication Data

US 2008/0055313 A1   Mar. 6, 2008

(51) Int. Cl.
*G06F 17/211* (2006.01)

(52) U.S. Cl.
USPC ......... 715/243; 715/227; 705/7.18; 705/7.19; 705/7.2; 705/7.21

(58) Field of Classification Search
USPC .... 715/243, 234, 227, 228; 705/9, 7.15–7.21; 345/440, 440.2
See application file for complete search history.

(56) References Cited

U.S. PATENT DOCUMENTS

| | | |
|---|---|---|
| 4,752,877 A | 6/1988 | Roberts et al. |
| 5,315,508 A | 5/1994 | Bain et al. |
| 5,400,253 A | 3/1995 | O'Connor |
| 5,444,820 A | 8/1995 | Tzes et al. |
| 5,546,507 A | 8/1996 | Staub |
| 5,615,109 A | 3/1997 | Eder |
| 5,701,400 A | 12/1997 | Amado |
| 5,745,110 A * | 4/1998 | Ertemalp ................. 715/764 |
| 5,758,327 A | 5/1998 | Gardner et al. |
| 5,832,532 A * | 11/1998 | Kennedy et al. ........... 715/215 |
| 5,870,716 A | 2/1999 | Sugiyama et al. |
| 5,930,771 A | 7/1999 | Stapp |
| 5,970,490 A | 10/1999 | Morgenstern |
| 5,974,391 A * | 10/1999 | Hongawa ................... 705/7 |
| 5,974,407 A | 10/1999 | Sacks |
| 5,982,383 A * | 11/1999 | Kumar et al. ............. 345/440 |
| 5,999,914 A | 12/1999 | Blinn et al. |
| 6,029,139 A | 2/2000 | Cunningham et al. |
| 6,064,984 A | 5/2000 | Ferguson et al. |
| 6,260,024 B1 | 7/2001 | Shkedy |
| 6,341,351 B1 | 1/2002 | Muralidhran et al. |

(Continued)

FOREIGN PATENT DOCUMENTS

| | | |
|---|---|---|
| JP | 2004-030343 A | 1/2004 |
| WO | WO 99/45450 A2 | 9/1999 |
| WO | WO 01/71635 A2 | 9/2001 |

OTHER PUBLICATIONS

Okuda, Development of Gantt Chart Viewer with XML Interface, vol. 1st; No. ; p. 13-14 (2001), Pub. Country: Japan, Language: Japanese.*

(Continued)

*Primary Examiner* — Stephen Hong
*Assistant Examiner* — Ahamed I Nazar

(57) ABSTRACT

Methods and devices are provided for a computer implemented method of producing a chart, such as, for example, a Gantt chart. The method can include providing a template containing a definition of at least one column of the chart and inserting the template into a basic layout to form a document. An instruction to add a row to the chart is received. The instruction can include at least one type of information pertaining to the first task to be included on the chart contained in the document. The method further includes adding the row pertaining to the first task contained in the document. In one example, the template is an XML template, the basic layout is an XML basic layout and the document is an XML document.

22 Claims, 3 Drawing Sheets

U.S. PATENT DOCUMENTS

| | | | |
|---|---|---|---|
| 6,405,181 B2 | 6/2002 | Lent et al. | |
| 6,405,191 B1 | 6/2002 | Bhatt et al. | |
| 6,505,093 B1 | 1/2003 | Thatcher et al. | |
| 6,507,851 B1 | 1/2003 | Fujiwara et al. | |
| 6,647,410 B1* | 11/2003 | Scimone et al. | 709/206 |
| 6,701,299 B2 | 3/2004 | Kraisser et al. | |
| 6,725,204 B1 | 4/2004 | Gusley | |
| 6,732,114 B1* | 5/2004 | Aamodt et al. | 715/243 |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,031,951 B2 | 4/2006 | Mancisidor et al. | |
| 7,080,030 B2 | 7/2006 | Eglen et al. | |
| 7,082,408 B1 | 7/2006 | Baumann et al. | |
| 7,092,929 B1 | 8/2006 | Dvorak et al. | |
| 7,100,083 B2 | 8/2006 | Little et al. | |
| 7,117,165 B1 | 10/2006 | Adam et al. | |
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,197,559 B2 | 3/2007 | Goldstein et al. | |
| 7,275,048 B2 | 9/2007 | Bigus et al. | |
| 7,546,522 B2* | 6/2009 | Tolle et al. | 715/215 |
| 7,596,546 B2* | 9/2009 | Matchett et al. | 705/7.38 |
| 7,640,496 B1* | 12/2009 | Chaulk et al. | 715/243 |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0049634 A1 | 12/2001 | Stewart | |
| 2002/0013731 A1 | 1/2002 | Bright et al. | |
| 2002/0023500 A1 | 2/2002 | Chikuan et al. | |
| 2002/0026368 A1 | 2/2002 | Carter, III | |
| 2002/0059108 A1 | 5/2002 | Okura et al. | |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0087389 A1 | 7/2002 | Sklarz et al. | |
| 2002/0107713 A1 | 8/2002 | Hawkins | |
| 2002/0116241 A1 | 8/2002 | Sandhu et al. | |
| 2002/0123930 A1 | 9/2002 | Boyd et al. | |
| 2002/0138290 A1 | 9/2002 | Metcalfe et al. | |
| 2002/0147668 A1 | 10/2002 | Smith et al. | |
| 2002/0152128 A1 | 10/2002 | Walch et al. | |
| 2002/0156772 A1 | 10/2002 | Chau et al. | |
| 2002/0184116 A1 | 12/2002 | Tam et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0074269 A1 | 4/2003 | Viswanath | |
| 2003/0120686 A1 | 6/2003 | Kim et al. | |
| 2003/0126024 A1 | 7/2003 | Crampton et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0167265 A1 | 9/2003 | Corynen | |
| 2003/0171998 A1 | 9/2003 | Pujar et al. | |
| 2003/0172007 A1 | 9/2003 | Helmolt et al. | |
| 2003/0200150 A1 | 10/2003 | Westcott et al. | |
| 2003/0208365 A1 | 11/2003 | Avery et al. | |
| 2003/0229502 A1 | 12/2003 | Woo | |
| 2004/0010463 A1 | 1/2004 | Hahn-Carlson et al. | |
| 2004/0039627 A1* | 2/2004 | Palms et al. | 705/9 |
| 2004/0078727 A1 | 4/2004 | Little et al. | |
| 2004/0098358 A1 | 5/2004 | Roediger | |
| 2004/0119713 A1* | 6/2004 | Meyringer | 345/440 |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0267674 A1 | 12/2004 | Feng et al. | |
| 2005/0015303 A1 | 1/2005 | Dubin et al. | |
| 2005/0039163 A1* | 2/2005 | Barrett et al. | 717/105 |
| 2005/0055283 A1 | 3/2005 | Zarovinsky | |
| 2005/0060270 A1 | 3/2005 | Ramakrishnan | |
| 2005/0065965 A1 | 3/2005 | Ziemann et al. | |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0086125 A1 | 4/2005 | Cirulli et al. | |
| 2005/0096122 A1 | 5/2005 | Nireki et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0114270 A1 | 5/2005 | Hind et al. | |
| 2005/0131764 A1 | 6/2005 | Pearson et al. | |
| 2005/0159990 A1* | 7/2005 | Barrett | 705/8 |
| 2005/0160084 A1* | 7/2005 | Barrett | 707/3 |
| 2005/0165659 A1 | 7/2005 | Gruber | |
| 2005/0171825 A1 | 8/2005 | Denton et al. | |
| 2005/0228786 A1 | 10/2005 | Murthy et al. | |
| 2005/0262425 A1* | 11/2005 | Vignet | 715/500 |
| 2005/0288987 A1* | 12/2005 | Sattler et al. | 705/9 |
| 2006/0020512 A1 | 1/2006 | Lucas et al. | |
| 2006/0036507 A1 | 2/2006 | Pujar et al. | |
| 2006/0041539 A1* | 2/2006 | Matchett et al. | 707/3 |
| 2006/0070020 A1* | 3/2006 | Puttaswamy et al. | 717/101 |
| 2006/0082594 A1* | 4/2006 | Vafiadis et al. | 345/629 |
| 2006/0112099 A1 | 5/2006 | Musgrove et al. | |
| 2006/0132480 A1* | 6/2006 | Muller | 345/418 |
| 2006/0212324 A1* | 9/2006 | Okman et al. | 705/7 |
| 2007/0050272 A1 | 3/2007 | Godlewski et al. | |
| 2007/0073575 A1* | 3/2007 | Yomogida | 705/9 |
| 2007/0139418 A1* | 6/2007 | Abel et al. | 345/474 |
| 2007/0234201 A1* | 10/2007 | Fukura et al. | 715/513 |
| 2008/0082374 A1 | 4/2008 | Kennis et al. | |
| 2009/0240737 A1 | 9/2009 | Hardisty et al. | |

OTHER PUBLICATIONS

Zhang et al., hereinafter as Zhang, "A Coloured Petri Net based Tool for Course of Action", system Simulation and Assessment Group, Defence Science and Technology Organization, Edinburgh, SA 5111, Australia, pp. 1-10.*

Zhang et al., "A Coloured Petri Net based Tool for Course of Action", system Simulation and Assessment Group, Defence Science and Technology Organization, Edinburgh, SA 5111, Australia, pp. 1-10.*

GanttProject by Thomas, published Apr. 2005, pp. 1-24.*

XML editor by Wikipedia, the free encyclopedia, published May 2006, pp. 1-4.*

U.S. Appl. No. 60/374,892, filed Apr. 22, 2002, Krajec.

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p.50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

Advisory Action for U.S. Appl. No. 11/514,008, mail date Jun. 22, 2010, 2 pages.

Notice of Allowance and Examiner's Amendment for U.S. Appl. No. 11/601,093, mail date Oct. 19, 2009, 9 pages.

Notice of Allowance and Examiner's Amendment for U.S. Appl. No. 11/606,124, mail date Apr. 17, 2009, 7 pages.

Notice of Allowance for U.S. Appl. No. 11/880,542, mail date Jan. 26, 2010, 7 pages.

Notice of Allowance for U.S. Appl. No. 11/880,590, mail date Feb. 22, 2010, 7 pages.

Notice of Allowance for U.S. Appl. No. 11/880,590, mail date May 27, 2010, 8 pages.

Notice of Allowance for U.S. Appl. No. 11/880,602, mail date Jan. 26, 2010, 6 pages.

Office Action and Interview Summary for U.S. Appl. No. 11/601,093, mail date Jun. 8, 2009, 19 pages.

Office Action for U.S. Appl. No. 11/601,093, mail date Jan. 29, 2009, 14 pages.

Office Action for U.S. Appl. No. 11/606,124, mail date Oct. 6, 2008, 16 pages.

Office Action for U.S. Appl. No. 11/880,542, mail date Oct. 1, 2009, 9 pages.

Office Action for U.S. Appl. No. 11/880,590, mail date Sep. 28, 2009, 11 pages.

Office Action for U.S. Appl. No. 11/880,602, mail date Sep. 30, 2009, 12 pages.

\* cited by examiner

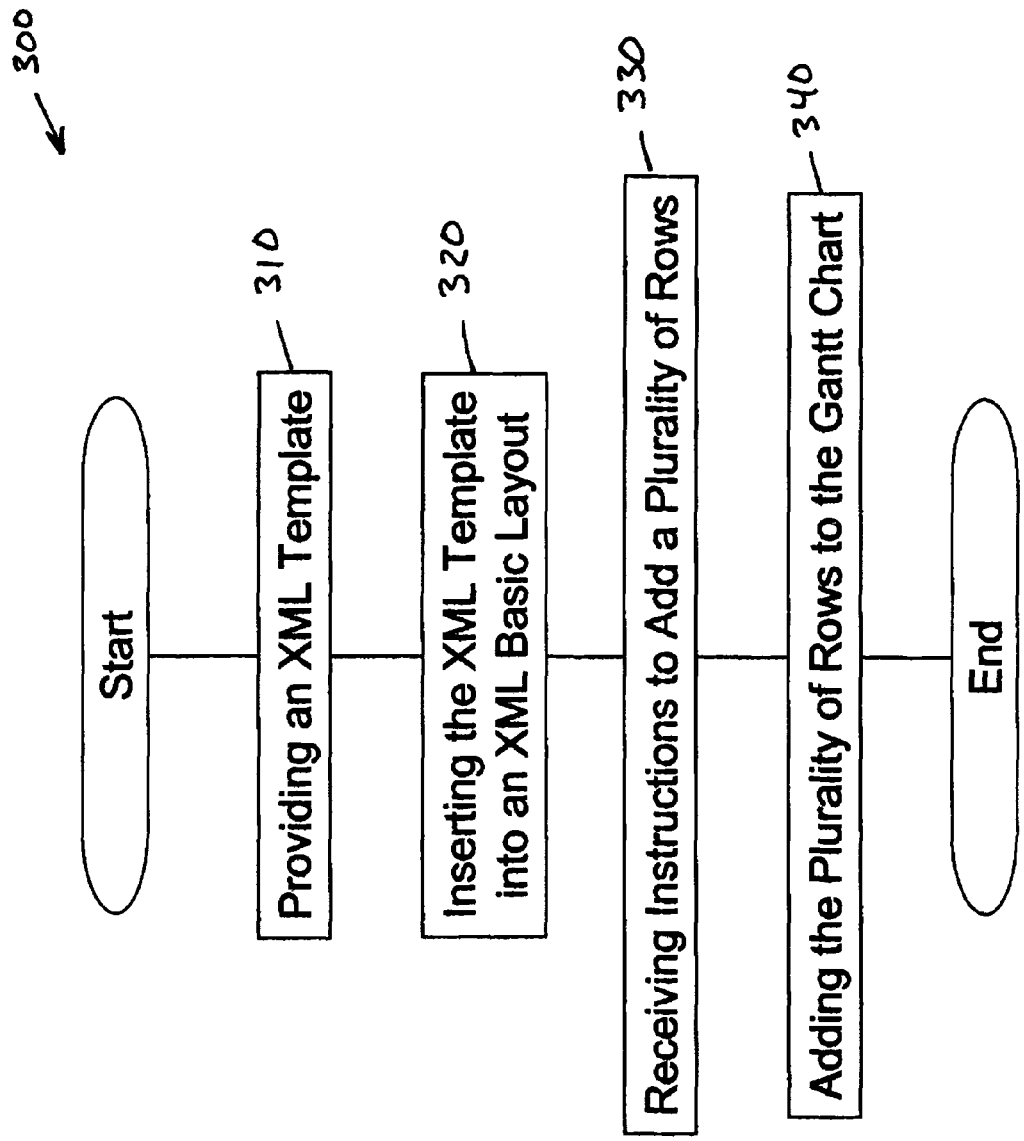

PRODUCING A CHART

FIELD

The present application relates generally to the field of formatting and displaying of data. The present application relates more specifically to the creation of charts, e.g. Gantt charts and other charts.

BACKGROUND

Charts have been used to graphically illustrate various activities or tasks over a time line. Various application programs often face difficulty, or introduce a need for extensive, specialized programming, when generating charts. Also, charts produced by various application programs, and even charts produced by a single application program, often have dissimilar formatting. These disadvantages are particularly applicable to the generation of Gantt charts.

The widespread use of the browser has prompted various programming languages and data formats to enable a display of data within the browser. In one example, the extensible mark-up language (XML) is a language used for representing data. An extensible style-sheet language (XSL) may be used to transform XML data or other types of data for purposes of displaying the data. However, each application program typically must process the data and convert the data into an XML description. Each application program requires its own XSL transformation or Simple Transformation. Because each application program is doing its own conversion, the forms and sizes of individual graphics that are shown are encoded in the conversion, precluding adaptation or exchange without programming requirements.

Thus, there is a need to address some of the deficiencies of conventional approaches to producing charts, such as Gantt charts. Further, there is a need to optionally produce Gantt charts that may reduce programming requirements across a variety of application programs. Further, there is a need to produce Gantt charts with similar formatting, including across application programs, regardless of task or activity format, while allowing for variations and customizations of the Gantt chart as desired.

SUMMARY

According to one embodiment, a method of producing a chart is provided. The method can include providing a template containing a definition of at least one column of the chart and inserting the template into a basic layout to form a document. An instruction to add a row to the chart is received. The instruction can include at least one type of information pertaining to the first task to be included on the chart contained in the document. The method further includes adding the row pertaining to the first task contained in the document. In one example, the template is an XML template, the basic layout is an XML basic layout and the document is an XML document.

According to another embodiment, a computer implemented method of producing a Gantt chart is provided. This method also includes providing an XML template containing a definition of at least one column of the Gantt chart and inserting the XML template into an XML basic layout to form an XML document. Instructions to add a plurality of rows to the Gantt chart are received, the instructions including at least one type of information pertaining to a task corresponding to a row of the plurality of rows to be included on the Gantt chart contained in the XML document. The method further includes adding the plurality of rows pertaining to the plurality of tasks contained in the XML document.

According to a further embodiment, computer-readable medium is provided for use with an electronic device. The medium has instructions executable using the electronic device for performing a method of producing a Gantt chart. This method includes providing an XML template containing a definition of at least one column of the Gantt chart and inserting the XML template into an XML basic layout to form an XML document. Instructions to add a plurality of rows to the Gantt chart are received, the instructions including at least one type of information pertaining to a task corresponding to a row of the plurality of rows to be included on the Gantt chart contained in the XML document. The method further includes adding the plurality of rows pertaining to the plurality of tasks contained in the XML document.

BRIEF DESCRIPTION OF THE DRAWINGS

Exemplary embodiments will be apparent from the description herein and the accompanying drawings.

FIG. 3 is an illustration of another example method of producing a Gantt chart according to an embodiment of the invention.

DETAILED DESCRIPTION

According to various embodiments of the invention, methods and devices are provided for producing Gantt charts using an engine that can use an XML template in combination with an XML basic layout, along with an ability to add rows to the Gantt chart representative of tasks, as instructed by the application program. Although embodiments are described with respect to Gantt charts, other types of charts can utilize the principles of the invention without departing from the scope of the claims.

As used herein, the term "task" is meant to refer to any type of task, milestone, category title, event or activity that may be included in a chart, such as a Gantt chart. Tasks may have a duration and may have associations with one or more other tasks. Types of information pertaining to a task may include, but are not limited to, task name, start date and/or time, end date and/or time, duration, resource assigned to the task, location of the task, associations with other tasks, hierarchy level, schedule restrictions on the task and a task identifier. As used herein, the term "Gantt chart" is meant to refer to any type of chart that depicts one or more tasks relative to a timeline.

Figure 1:
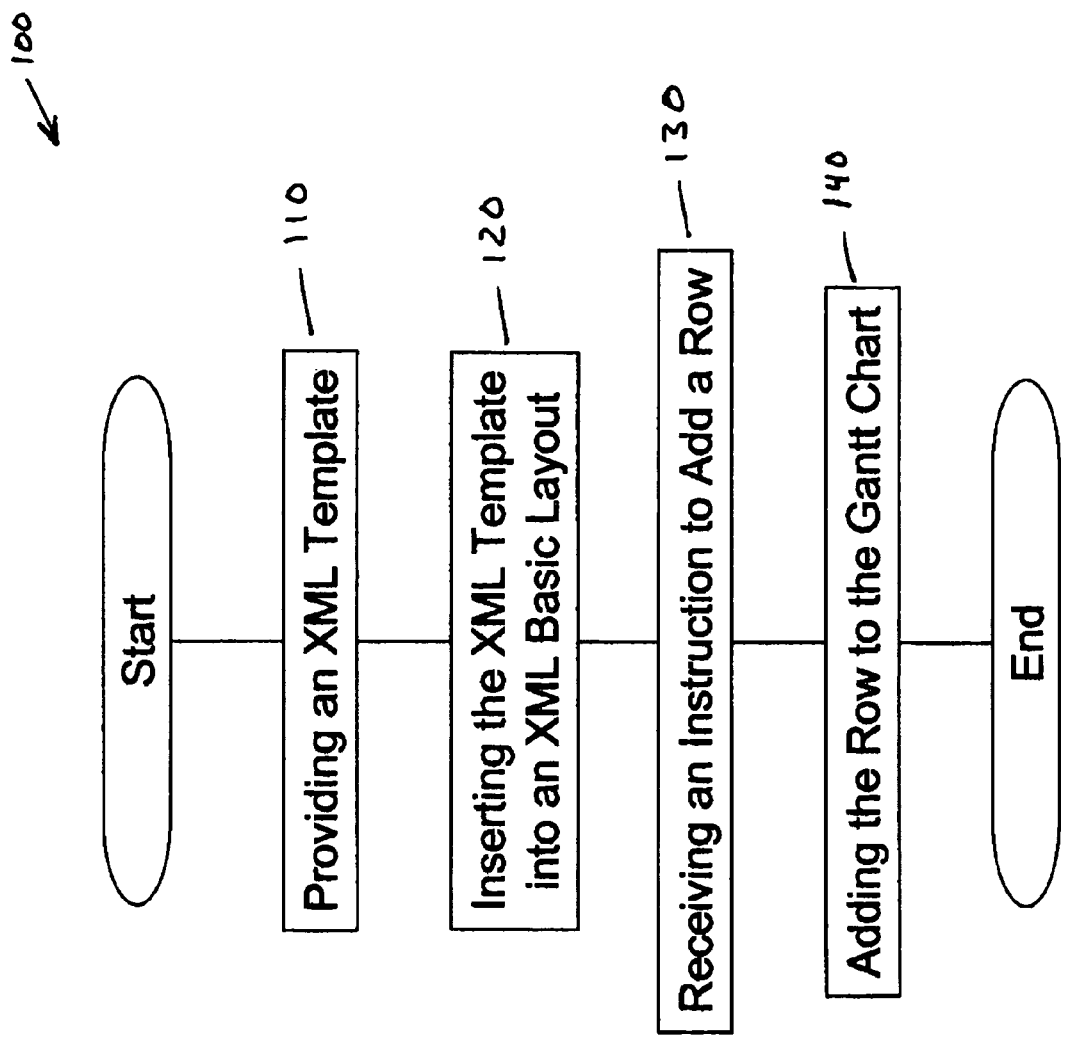
FIG. 1 is an illustration of an example of a method of producing a Gantt chart according to an embodiment of the invention.

With reference to FIG. 1, a method 100 according to an exemplary embodiment is illustrated by way of example. The examples and implementations are provided using XML as an illustrative language. However, various embodiments are not so limited, and may be implemented in other versions of XML, including subsequent versions, as well as in other languages or other computer-executable instruction formats, such as, for example Java and HTML. The method 100 is a computer implemented method of producing a chart, e.g. a Gantt chart. The method includes providing 110 an XML template containing a definition of at least one column of the Gantt chart and inserting 120 the XML template into an XML basic layout to form an XML document. Columns of the Gantt chart can optionally be specified and display task information pertaining to the tasks, such as the task name, duration, etc., as desired. An instruction to add a row to the Gantt chart is received 130, the instruction including at least one type of information pertaining to the first task to be included on the Gantt chart contained in the XML document. The method further includes adding 140 the row pertaining to the first task contained in the XML document.

Figure 2:
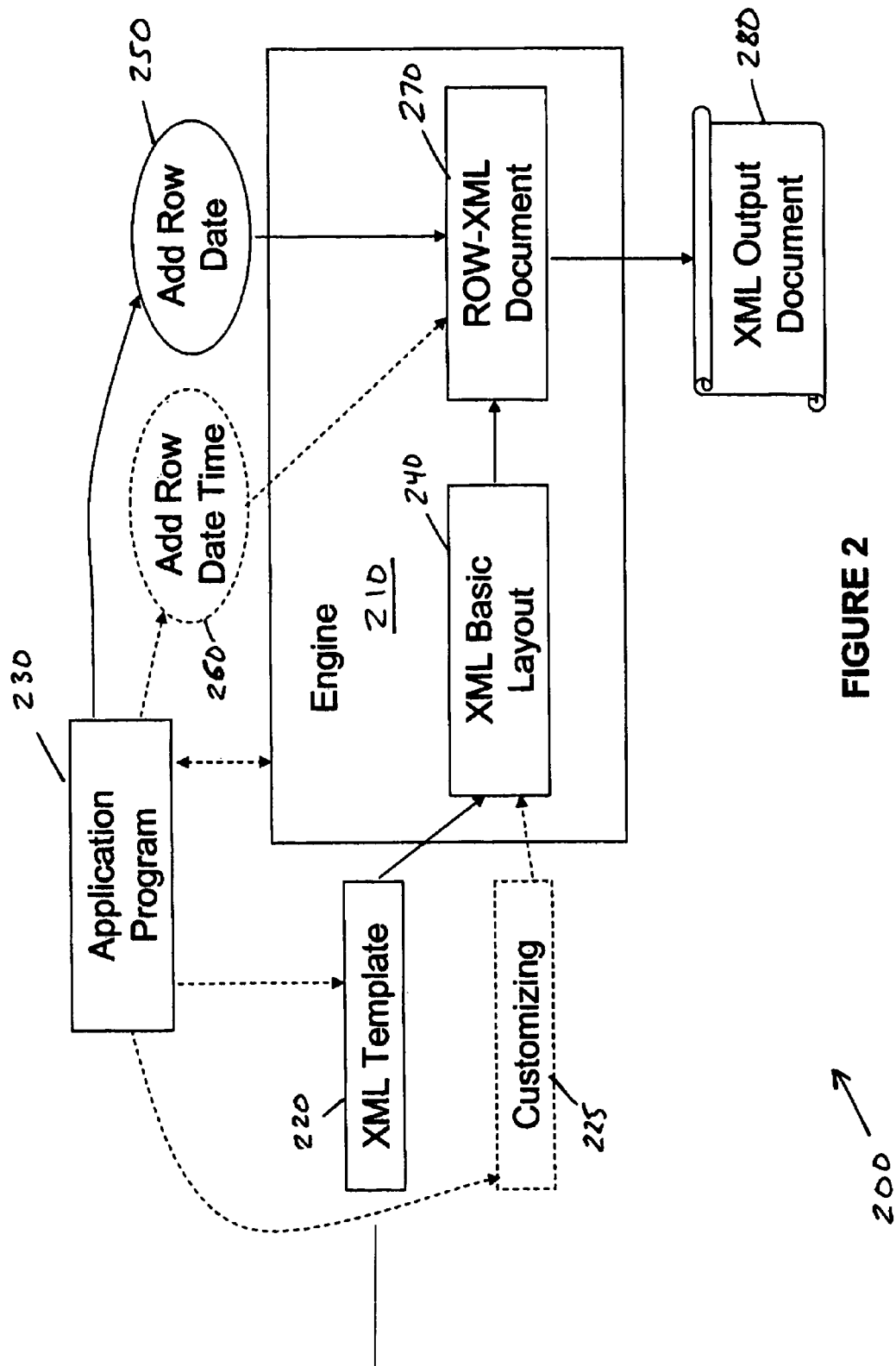
FIG. 2 is a schematic illustration of an engine for producing a Gantt chart according to embodiment of the invention.

According to an example implementation as illustrated by the schematic 200 of FIG. 2, an engine 210 is provided. An XML template 220 may contain the definition(s) for one or more columns corresponding to the tasks. Therefore, the layout need not be encoded in the application program 230 so that company- or group-specific adaptation of the layout may be standardized within the group or company, and/or by a single user. In the example implementation, the XML template 220 includes processing instructions to identify the graphic output of the duration of the timeline in the Gantt chart as a template. In the example implementation, each application program 230 would have its own XML template 220, although the invention includes implementations where an XML template is used for multiple application programs.

An example XML template 220 for a task is as follows. Every expression beginning with "SAP" is understood by the engine as a signal word. However, various other expressions can be signal words. In the example, the engine will handle signal words as special instructions and not as XML-instructions. For the signal words XML-processing instructions are used e.g. <? . . . ?>.

```
<?SAP begin template task?> <!--Definition of the processing instruction
for a template-->
   <header>
      <label>My first task</label> <!--Definition of the title of the
      first column -->
         <!--If additional columns are needed then the titles of these columns
            can be added using the normal XML-syntax-->
   </header>
   <row>
      <label>SAP name of the task</label> <!-- "SAP name of the task"
will be interpreted by the engine as a variable. The engine will replace
this variable using the add row date method 250 or add row
date time method 260-->
         <!--If additional columns are needed then they can be added
            using the normal XML-syntax-->
   </row>
<?SAP begin template task?>
```

The XML basic layout 240 can contain all XML definitions and declarations for showing GANTT charts with JNet, a software product available from SAP AG of Germany, or an extension of JNet like JGANTT, a software product available from Knowledge Relay of Los Alamitos, Calif. The instructions of the XML template 220 passed to the engine 210 can be inserted in the appropriate parts in the XML basic layout 240. The XML template 220 may contain the definition of the columns for the tasks. Additional features can be added to the XML template 220 because the XML template 220 uses the XML language and the engine 210 inserts the XML template 220 in the XML basic layout 240. By way of non-limiting example, to include functionality to perform an action by double clicking on a specified row, appropriate code can be added in the XML template 220, such as by normal XML language and processing instructions. For example the additional coding could begin with the processing instruction <?SAP begin additional coding?> and end it with <?SAP end additional coding?>. In the example implementation, the engine 210 will add the coding to the appropriate part in the XML template 220. In the XML basic layout 240, control data may be stored in order to insert the XML template 220 at the appropriate part in the XML basic layout 240. The engine 210 searches this control data and inserts the XML template 220. The XML template 220 may be marked with processing instructions. XML processing instructions are ignored by application programs if not understood.

Optionally, customization 225 may be provided. In the example implementation, customization 225 may include color definitions and various other custom variables to replace variables in the XML basic layout 240, as desired.

Various methods may be provided to initiate the addition of task information to the Gantt chart. In the example implementation, an add row date 250 method is provided. Optionally or alternatively, an add row date time 260 method may be provided, or other methods corresponding to the task information may be provided. The add row date 250 may be used where display of time is not desired or required, while the add row date time 260 may optionally be used to provide and/or display the time information on the Gantt chart. When either of the methods are called, the engine 210 receives the instruction and generates XML coding for adding a row based on the values passed to the methods add row date 250 and add row date time 260. Internally, in the example implementation, this means the engine 210 inserts the lines and modify existing lines in a ROW-XML document 270.

In the XML basic layout 240, all layout data that could be influenced either by customizing 225 or the input data from the methods add row date 250/add row date time 260 is defined in variables in the example implementation. The engine 210 can replace the customizing variables and write the ROW-XML document 270. This ROW-XML document 270 can contain additional control data for the engine 210 like the XML template 220 definition. The engine 210 may then remove some or all of the control data to produce an XML output document 280.

Another example method 300 is illustrated in FIG. 3. The method 300 provides a computer implemented method of producing a Gantt chart. This method 300 includes providing 310 an XML template containing a definition of at least one column of the Gantt chart and inserting 320 the XML template into an XML basic layout to form an XML document. Instructions to add a plurality of rows to the Gantt chart are received 330. The instructions include at least one type of information pertaining to a task corresponding to a row of the plurality of rows to be included on the Gantt chart contained in the XML document. The method further includes adding 340 the plurality of rows pertaining to the plurality of tasks contained in the XML document. It is contemplated that various embodiments of the invention may be provided on a computer-readable medium.

Embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

Various embodiments of the invention are described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention, in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

The illustrative embodiments, implementations and examples herein are meant to be illustrative and not limiting. The present invention has been described by way of example, and modifications and variations of the exemplary embodiments will suggest themselves to skilled artisans in this field without departing from the spirit of the invention. For example, although specific chart types, programming languages and subroutines are discussed, they are not discussed in a limiting fashion. Features and characteristics of the above-described embodiments may be used in combination. The preferred embodiments are merely illustrative and should not be considered restrictive in any way.

What is claimed is:

1. A computer-implemented method of producing a Gantt chart, comprising:
providing an XML template defining at least one column of the Gantt chart and a non-XML code instruction including functionality to add a row;
inserting the definition of the at least one column and the non-XML code instruction to add the row into an XML basic layout;
calling a method to perform the non-XML code instruction to add the row to the Gantt chart, the row representing a first task to be included on the Gantt chart;
generating XML coding for adding the row representing the first task based on the non-XML code instruction and the called method;
adding the XML coding for adding the row to a ROW-XML document, the ROW-XML document including control data; and
removing the control data from the ROW-XML document to produce an XML output document.

2. The method of claim 1, wherein:
the control data includes a definition of the XML template.

3. The method of claim 1, further comprising modifying existing lines of XML code in the ROW-XML document based on receiving the instruction to add the row.

4. The method of claim 1, wherein the instruction to add the row includes date information associated with the first task.

5. The method of claim 1, further comprising customizing the XML basic layout by replacing at least one variable in the XML basic layout with a customized value.

6. The method of claim 5, wherein the customized value is a color definition.

7. The method of claim 1, wherein:
the non-XML code instruction including functionality to add the row includes a non-XML code instruction including functionality to add the row upon receiving a user input during interaction with the ROW-XML document.

8. A computer-implemented method of producing a Gantt chart, comprising:
providing an XML template defining at least one column of the Gantt chart and including a non-XML code instruction including functionality to add a row;
inserting the definition of the at least one column and the non-XML code instruction to add the row into an XML basic layout, the XML basic layout containing information regarding a layout of the Gantt chart;
calling a method to perform the non-XML code instruction to add the row to the Gantt chart, the method including at least one type of information associated with a task corresponding to the row to be included in the Gantt chart;
generating XML coding for adding the row to the Gantt chart based on the non-XML code instruction and the called method;
adding the XML coding for adding the row to a ROW-XML document, the ROW-XML document including control data; and
removing the control data from the ROW-XML document to produce an XML output document.

9. A non-transitory computer-readable storage medium for use with an electronic device, the computer-readable storage medium having instructions stored thereon which are configured to cause the electronic device to perform at least:

providing an XML template defining at least one column of a Gantt chart and including a non-XML code instruction including functionality to add a row;

inserting the definition of the at least one column and the non-XML code instruction to add the row into an XML basic layout;

calling a method to perform the non-XML code instruction to add the row to the Gantt chart, the row representing a first task to be included in the Gantt chart;

generating XML coding for adding the row representing the first task to the Gantt chart based on the received non-XML code instruction and the called method;

adding the XML coding for adding the row to a ROW-XML document, the ROW-XML document including control data; and removing the control data from the ROW-XML document to produce an XML output document.

10. The computer-readable storage medium of claim 9, wherein:

the control data includes a definition of the XML template.

11. The computer-readable storage medium of claim 9, wherein the instructions are further configured to cause the electronic device to modify existing lines of XML code in the ROW-XML document based on the non-XML code instruction including functionality to add the row to the Gantt chart.

12. The computer-readable storage medium of claim 9, wherein the non-XML code instruction including functionality to add the row includes date information associated with the first task.

13. The computer-readable storage medium of claim 9, wherein the non-XML code instruction including functionality to add the row includes date and time information associated with the first task.

14. The computer-readable storage medium of claim 9, wherein the non-XML code instruction including functionality to add the row includes task name information associated with the first task.

15. The computer-readable storage medium of claim 9, wherein the non-XML code instruction including functionality to add the row includes instructions to display information associated with the first task in a first column and information associated with the first task in a second column.

16. The computer-readable storage medium of claim 9, wherein the instructions are further configured to cause the electronic device to replace at least one variable in the XML basic layout with a customized value.

17. The method of claim 1, wherein the XML template includes processing instructions to identify a graphic output of a duration of a timeline in the Gantt chart.

18. The method of claim 17, wherein the XML basic layout contains XML definitions for showing the Gantt chart.

19. The method of claim 1, wherein the XML template defining at least one column defines a title of the at least one column of the Gantt chart and a name of a second task associated with the at least one column.

20. The method of claim 1, wherein the XML template defining at least one column defines at least a first column of the Gantt chart and a second column of the Gantt chart.

21. The method of claim 1, wherein:

the XML basic layout includes control data for inserting the XML code defining at least one column into an appropriate part of the XML basic layout; and the inserting includes inserting the XML code defining at least one column into the appropriate part of the XML basic layout based on the control data included in the XML basic layout.

22. The method of claim 1, wherein the non-XML code instruction including functionality to add the row includes non-XML code including functionality to add the row by double clicking on a specified row.

\* \* \* \* \*